Patented Apr. 5, 1938

2,112,899

UNITED STATES PATENT OFFICE 2,112,899

DERIVATIVES OF AC-TETRAHYDRO-BETA-NAPHTHYLAMINE

William A. Lott, East Orange, N. J., and Harold W. Coles, Pittsburgh, Pa., assignors to E. R. Squibb & Sons, New York, N. Y., a corporation of New York No Drawing. Application March 9, 1935, Serial No. 10,248

9 Claims. (Cl. 260—103)

This invention relates to, and has for its object the provision of, certain derivatives of ac-tetrahydro-beta-naphthylamine—some of which show promise of utility as local anesthetics—and methods of preparing them.

The compounds of this invention comprise the class consisting of bases having the general formula

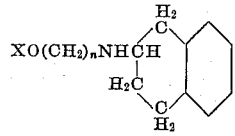

wherein X represents a hydrogen atom or an acyl group (alkyl, aryl, or aralkyl) and $n$ represents an integer; and their salts.

Such compounds in which X represents a hydrogen atom (the alkanols) may be prepared by interacting the appropriate alkylene halogenohydrin (for example, ethylene chlorohydrin) and ac-tetrahydro-beta-naphthylamine, preferably in the presence of an inert solvent (for example, benzene, xylene, or cymene), and preferably while passing dry nitrogen through the solution. By heating at about 100–150° the reaction time may be kept down to about two or three hours. The desired alkanol (in the form of the base) is separated from the reaction mixture by adding ether, filtering, distilling off the ether and any solvent used for condensation, and purifying by fractional distillation; or the alkanol may be obtained in the form of a salt by passing dry hydrogen chloride through the solution of the base and purifying the precipitate by fractional crystallization from a suitable solvent—and the hydrochloride thus obtained may be converted into other salts (for example, the borate, nitrate, lactate, tartrate, citrate, phosphate, sulfate, picrate, or picrolonate) by treatment with the appropriate acid.

Such compounds in which X represents an acyl group (the esters) may be prepared ($a$) by treating the appropriate alkanol with the appropriate acyl (for example, benzoyl, nitrobenzoyl, cinnamyl, methylbenzoyl, chlorobenzoyl, caproyl, or phthalyl) chloride or acid (for example, benzoic) anhydride or derivative thereof; or ($b$) by interacting the appropriate halogeno-alkyl ester (for example, beta-chloroethyl-benzoate) and ac-tetrahydro-beta-naphthylamine under conditions and according to procedures similar to those set forth above with respect to the preparation of the alkanols.

Melting points given below are U. S. P. corrected, degrees centigrade.

*Example I.—Beta-(ac-tetrahydro-beta-naphthylamino)-ethanol hydrochloride*

Two molecular equivalents (47 g.) of freshly prepared ac-tetrahydro-beta-naphthylamine, one molecular equivalent (12.9 g.) of ethylene chlorohydrin and 25 c. c. of xylene are mixed together in a 200 c. c. round-bottomed flask, equipped with a thermometer, reflux condenser, and glass tubing reaching to the bottom of the flask, thru which a steady stream of dry nitrogen is passed during the entire reaction. The flask and contents are immersed in an oil-bath, the temperature of the flask contents raised to 110°, and the reaction is allowed to continue for three hours at a temperature of 110–115°. The reaction mixture is cooled, 100 c. c. dry ether is added, and the precipitated ac-tetrahydro-beta-naphthylamine hydrochloride (M. P. 237°) is filtered off and washed repeatedly with dry ether.

The ether-xylene filtrate is chilled, and dry hydrogen chloride is passed slowly thru the solution until precipitation is complete, as is indicated when no further clouding in the clear supernatant liquid is produced by the hydrogen chloride. This precipitate, which consists mainly of beta-(ac-tetrahydro-beta-naphthylamino)-ethanol hydrochloride with possibly some unreacted ac-tetrahydro-beta-naphthylamine hydrochloride as an impurity, is filtered by suction on to a Buchner funnel, and washed well with dry ether. The beta-(ac-tetrahydro-beta-naphthylamino)-ethanol hydrochloride is purified by throwing it out of a large volume of ethyl alcohol with ether. The compound is readily soluble in water, acetone, and methyl and ethyl alcohols, but insoluble in ether and benzene. It melts at 183.8–184.8°.

*Example II.—Gamma-(ac-tetrahydro-beta-naphthylamino)-propanol hydrochloride*

This compound, which may be prepared in accordance with Example I, has a melting point of 161°.

*Example III.—Gamma-(ac-tetrahydro-beta-naphthylamino)-propyl benzoate hydrochloride*

One molecular equivalent (6.74 grams) of gamma-chloropropyl benzoate is dissolved in 25 c. c. of xylene contained in a 200 c. c. round-bottomed flask. To this is added two molecular equivalents (10 grams) of freshly distilled ac-tetrahydro-beta-naphthylamine. A slight amount of white solid is formed immediately. A fairly rapid stream of dry nitrogen gas is passed into the solution, as the temperature of the flask contents, in the course of 30 minutes, is brought up to 150° by immersion of the flask in an oil-bath. The temperature is held between 150–155° for two and one-half hours. The flask is removed from the oil-bath, about 25 c. c. xylene is added, and the stream of nitrogen gas is continued until the contents of the flask are completely cooled.

The white solid, which is ac-tetrahydro-beta-naphthylamine hydrochloride (M. P. 237°), is filtered by means of a Buchner funnel, and is washed repeatedly with dry ether. The slightly yellow xylene-ether filtrate contains in solution largely the base gamma-(ac-tetrahydro-beta-naphthylamino)-propyl benzoate with possibly some unreacted ac-tetrahydro-beta-naphthylamine. The flask containing the filtrate is placed in an ice-salt mixture, and dry hydrogen chloride is passed slowly thru the xylene-ether filtrate until precipitation of the insoluble hydrochlorides of the gamma-(ac-tetrahydro-beta-naphthylamino)-propyl benzoate and the ac-tetrahydro-beta-naphthylamine (if any is present) is complete, as is indicated when no further cloudiness is produced in the solution by the hydrogen chloride. The flask and contents are allowed to chill completely, and the impure gamma-(ac-tetrahydro-beta-naphthylamino)-propyl benzoate hydrochloride is filtered on a Buchner funnel, and washed well with dry ether to remove any unreacted gamma-chloropropyl benzoate.

The impure hydrochloride is recrystallized from a hot mixture of methyl and isopropyl alcohols, at which the gamma-(ac-tetrahydro-beta-naphthylamino)-propyl benzoate hydrochloride separates out as crystals on cooling, being rather insoluble in an alcohol mixture containing isopropyl alcohol, while the ac-tetrahydro-beta-naphthylamine hydrochloride, if any is present as an impurity, remains in solution. The precipitated hydrochloride is filtered off, by means of a Buchner funnel, and is washed well with cold isopropyl alcohol, and finally with pure, dry ether. The crystalline product on the Buchner funnel is dried in an oven at 80°, and may be shown by chlorine assay to be substantially pure gamma-(ac-tetrahydro-beta-naphthylamino)-propyl benzoate hydrochloride, soluble in methyl and ethyl alcohols and acetone, slightly soluble in cold water, and insoluble in ether and benzene. The compound melts at 195.6°.

The corresponding picrate may be prepared by permitting a hot aqueous solution of the hydrochloride to flow slowly into an aqueous solution of picric acid, at which a nicely crystalline yellow precipitate separates out. This precipitate is filtered by suction, washed well on the Buchner funnel with distilled water, and is dried in the air. The crystals melt at 83.8°, and are only slightly soluble in water, but easily soluble in the alcohols, ether, acetone, chloroform, and benzene. Assay of the compound indicates its composition to be $C_{20}H_{23}NO_2 \cdot HOC_6H_2(NO_2)_3$.

*Example IV.—Beta-(ac-tetrahydro-beta-naphthylamino)-ethyl benzoate hydrochloride*

This compound is prepared by the same procedure as in Example III, using 6.27 g. of beta-chloroethyl benzoate instead of the gamma-chloropropyl benzoate. The beta-(ac-tetrahydro-beta-naphthylamino)-ethyl benzoate hydrochloride melts at 214.9°. The corresponding sulfate melts at 216.18°.

*Example V.—Beta-(ac-tetrahydro-beta-naphthylamino)-ethyl p-nitrobenzoate hydrochloride*

Ten grams of beta-(ac-tetrahydro-beta-naphthylamino)-ethanol hydrochloride is treated with 12.22 g. of p-nitrobenzoyl chloride, and the mixture is heated in an oil-bath at 140–160° until the evolution of HCl ceases. The reaction mixture is cooled, diluted with ether, and the precipitated hydrochloride of the p-nitrobenzoate is boiled three or four times with hot isopropyl alcohol, filtering each time while hot. The p-nitrobenzoate, difficultly soluble in most organic reagents, melts at 236.2°.

*Example VI.—Gamma-(ac-tetrahydro-beta-naphthylamino)-propyl p-nitrobenzoate hydrochloride*

This compound is prepared essentially as in Example V, except that 10 g. of gamma-(ac-tetrahydro-beta-naphthylamino)-propanol hydrochloride is treated with 10.5 grams of p-nitrobenzoyl chloride. The gamma-(ac-tetrahydro-beta-naphthylamino)-propyl p-nitrobenzoate hydrochloride melts at 228–229°.

*Example VII.—Beta-(ac-tetrahydro-beta-naphthylamino)-ethyl p-aminobenzoate di-hydrochloride*

Beta-(ac-tetrahydro-beta-naphthylamino)-ethyl p-nitrobenzoate hydrochloride is stirred into a paste with ten times its weight of iron powder, water, and dilute HCl. (Among other reducing agents that may be used here are sodium amalgam in aqueous solution; hydrogen under pressure, with platinum, palladium, or nickel, as a catalyst; and metals, such as zinc, in hydrochloric acid solution.) The mixture is allowed to stand, while stirred frequently, until it begins to cool, indicating completion of the reaction. The mixture is filtered, rendered alkaline with sodium carbonate, and extracted three or four times with benzene. The benzene extract is dried, and the dihydrochloride is thrown out by passing dry hydrogen chloride thru the chilled benzene solution. The dihydrochloride is filtered upon a Buchner funnel, dissolved in hot alcohol, and thrown out of the cold alcohol solution by the cautious addition of ether. The pure product, beta-(ac-tetrahydro-beta-naphthylamino)-ethyl p-aminobenzoate dihydrochloride, melts at 222–24° with decomposition.

Additional compounds that have been prepared —by processes such as those hereinbefore described—and their melting points, are as follows:

Beta-(ac-tetrahydro-beta-naphthylamino)-ethyl m-nitrobenzoate hydrochloride: 216–217°.

Gamma-(ac-tetrahydro-beta-naphthylamino)-propyl m-nitrobenzoate hydrochloride: 173.4–177.4°.

Beta-(ac-tetrahydro-beta-naphthylamino)-ethyl o-nitrobenzoate hydrochloride: 232.5–233°.

Beta-(ac-tetrahydro-beta-naphthylamino)- ethyl m-aminobenzoate dihydrochloride: 205–206°.

Beta-(ac-tetrahydro-beta-naphthylamino)-ethyl o-aminobenzoate dihydrochloride: 150°.

Beta-(ac-tetrahydro-beta-naphthylamino)-ethyl p-chlorobenzoate hydrochloride: 219–220°.

Gamma-(ac-tetrahydro-beta-naphthylamino)-propyl p-chlorobenzoate hydrochloride: 188.8–189.8°.

Beta-(ac-tetrahydro-beta-naphthylamino)-ethyl p-iodobenzoate hydrochloride: 232°.

Beta-(ac-tetrahydro-beta-naphthylamino)-ethyl cinnamate hydrochloride: 194.0–195.8°.

Gamma-(ac-tetrahydro-beta-naphthylamino)-propyl cinnamate hydrochloride: 204.8–206.8° (with decomposition).

Gamma-(ac-tetrahydro-beta-naphthylamino)-propyl beta-phenyl proprionate hydrochloride: softens at 95°; indefinite.

Di-(beta-(ac-tetrahydro-beta naphthylamino)-ethyl) phthalate dihydrochloride: 185–186°.

It is to be understood that the foregoing examples are merely illustrative and by no means limitative of the invention, which may be variously otherwise embodied within the scope of the appended claims.

We claim:

1. Compounds consisting of bases having the general formula

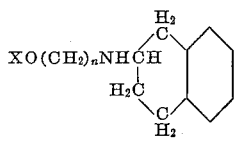

wherein X represents one of the group consisting of hydrogen and acyl and (CH$_2$)$_n$ represents a lower member of the alkylene series; and their acid-addition salts.

2. Salts of bases having the general formula

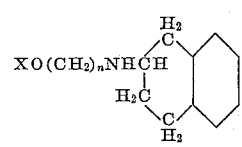

wherein X represents one of the group consisting of hydrogen and acyl and (CH$_2$)$_n$ represents a lower member of the alkylene series.

3. Compounds consisting of bases having the general formula

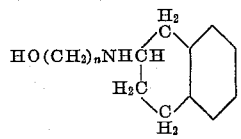

wherein (CH$_2$)$_n$ represents a lower member of the alkylene series; and their acid-addition salts.

4. Compounds consisting of bases having the general formula

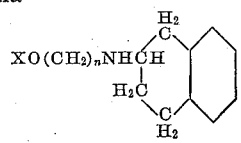

wherein X represents an acyl group and (CH$_2$)$_n$ represents a lower member of the alkylene series; and their acid-addition salts.

5. Compounds consisting of bases having the general formula

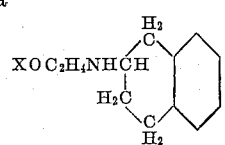

wherein X represents one of the group consisting of hydrogen and acyl; and their acid-addition salts.

6. Compounds consisting of bases having the general formula

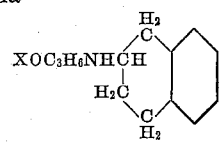

wherein X represents one of the group consisting of hydrogen and acyl; and their acid-addition salts.

7. Beta-(ac-tetrahydro-beta-naphthylamino)-ethanol hydrochloride.

8. Gamma-(ac-tetrahydro-beta-naphthylamino)-propyl benzoate hydrochloride.

9. Gamma-(ac-tetrahydro-beta-naphthylamino)-propyl cinnamate hydrochloride.

WILLIAM A. LOTT.
HAROLD W. COLES.